(12) United States Patent
Zhao et al.

(10) Patent No.: US 9,421,548 B2
(45) Date of Patent: Aug. 23, 2016

(54) SYSTEM AND METHOD FOR SCUTCHING MATERIAL FIBERS

(71) Applicant: Ford Global Technologies, LLC, Dearborn, MI (US)

(72) Inventors: Haibo Zhao, Northville, MI (US); Ann Marie Straccia, Southgate, MI (US); Daniel Quinn Houston, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 162 days.

(21) Appl. No.: 14/156,603

(22) Filed: Jan. 16, 2014

(65) Prior Publication Data

US 2015/0197877 A1    Jul. 16, 2015

(51) Int. Cl.
| | | |
|---|---|---|
| *B02C 18/02* | (2006.01) | |
| *B02C 18/04* | (2006.01) | |
| *B02C 1/14* | (2006.01) | |
| *D01G 9/00* | (2006.01) | |

(52) U.S. Cl.
CPC .............. *B02C 18/04* (2013.01); *B02C 1/14* (2013.01); *B02C 18/02* (2013.01); *D01G 9/00* (2013.01)

(58) Field of Classification Search
CPC ............ B02C 7/08; B02C 7/13; B02C 1/10; B02C 1/14; D21D 1/306; D21D 1/30; D21D 1/303
USPC ........ 241/24.19, 29, 262, 263, 261.2, 261.3, 241/270, 283
See application file for complete search history.

(56) References Cited

U.S. PATENT DOCUMENTS

| | | | | |
|---|---|---|---|---|
| 1,133,863 | A * | 3/1915 | Keooker ................. | B02C 17/14 241/270 |
| 3,741,863 | A * | 6/1973 | Brooks ............................. | 162/4 |
| 4,068,805 | A * | 1/1978 | Oswald ......................... | 241/159 |
| 5,447,276 | A * | 9/1995 | Aldridge et al. ............... | 241/79 |
| 5,697,560 | A * | 12/1997 | Bennett .......................... | 241/29 |
| 6,385,828 | B1 | 5/2002 | Kiss et al. | |
| 7,311,280 | B2 * | 12/2007 | Herren .................... | F25C 5/046 241/169 |
| 7,422,170 | B2 * | 9/2008 | Bao ......................... | B02C 18/24 241/168 |
| 7,861,956 | B2 * | 1/2011 | Hiller, Sr. .............. | B02C 1/005 241/263 |
| 7,886,999 | B2 * | 2/2011 | Ruzycky ................. | A47J 19/06 241/168 |
| 7,954,734 | B2 * | 6/2011 | Hata ............................... | 241/28 |

(Continued)

FOREIGN PATENT DOCUMENTS

WO     0208501 A1    1/2002

OTHER PUBLICATIONS

Jen-Chung Chen, Chuen-Guang Chao, Numerical simulation and experimental investigation for design of a carbon fiber tow pneumatic spreading system, Carbon 43 (2005), Abstract only.

*Primary Examiner* — Faye Francis
(74) *Attorney, Agent, or Firm* — Damian Porcari; Law Firm of Dr. Junqi Hang, PLC

(57) ABSTRACT

In at least one or more embodiments, a system for scutching material fibers includes first and second plates defining a first cavity to receive and discharge material fibers, the first plate including a first number teeth extending into the first cavity and movable in a first direction, the second plate including a second number of teeth extending into the first cavity and movable in a second direction different from the first direction. Teeth as present in the first number and/or the second number of teeth may be spaced apart from each. In certain instances, the material fibers may be carbon fibers.

10 Claims, 4 Drawing Sheets

(56) References Cited

U.S. PATENT DOCUMENTS

| | | | | |
|---|---|---|---|---|
| 8,393,563 B2* | 3/2013 | Chaoui | ................... | B02C 18/08 241/168 |
| 8,763,940 B2* | 7/2014 | Stofan | ....................... | B02C 1/10 241/270 |
| 2012/0048978 A1* | 3/2012 | Ling | ................... | B02C 19/0075 241/283 |
| 2012/0213997 A1 | 8/2012 | Wang et al. | | |

* cited by examiner

SYSTEM AND METHOD FOR SCUTCHING MATERIAL FIBERS

TECHNICAL FIELD

The disclosed inventive concept relates generally to system and method for scutching material fibers such as carbon fibers.

BACKGROUND

Driven by the increasing price of gasoline as well as the requirements for carbon dioxide reduction, the automotive industry is active in developing new technologies to improve vehicle fuel economy. One solution under development by many players in the industry is using lightweight materials to reduce vehicle weight.

Among the lightweight materials, carbon fiber is a well-known low-density material with good mechanical properties. Carbon fiber has been used in aerospace, wind energy, sporting goods and high-end vehicles. In these areas, the use of carbon fibers is in general of relatively lower volume but with a higher price tag compared with automotive industry. It may thus to be desirable to implement carbon fibers to high volume non-luxury vehicles in automotive industry.

One of the challenges resides in developing low cost processing technology for high volume production of carbon fibers. Sheet molding compound (SMC) process has been successfully used to manufacture glass fiber reinforced parts such as deck-lids, hoods and bumpers. However, it is not straightforward to use the same process for carbon fibers due to differences in physical properties. Carbon fibers are significantly smaller in diameter than glass fibers. This makes carbon fibers difficult to separate. In addition, the sizing materials coated on the carbon fiber surface make carbon fibers tend to agglomerate.

The bundling of carbon fibers causes is problematic in the SMC process, with one being that it becomes difficult for resin to wet out, and the other being that fibers do not flow well during molding. Carbon fiber reinforced SMC parts have not met the required mechanical performance due to one or more of these problems. An economical and effective method needs to be developed to improve the carbon fiber separation in carbon fiber SMC process in order to improve final part performance.

It would thus be advantageous if SMC such as carbon fiber reinforced SMC may be produced without these identified problems, particularly problems in relation to difficulties in carbon fiber de-bundling and filament separation.

SUMMARY

In at least one or more embodiments, a system for scutching material fibers includes first and second plates defining a first cavity to receive and discharge material fibers, the first plate including a first number teeth extending into the first cavity and movable in a first direction, the second plate including a second number of teeth extending into the first cavity and movable in a second direction different from the first direction. Teeth as present in the first number and/or the second number of teeth may be spaced apart from each. The material fibers may be carbon fibers.

The first and second plates may be positioned such that carbon fibers move within the first cavity along a direction of gravity. The first and second directions may be positioned such that the first number of teeth does not contact the second number of teeth.

The system may further include third and fourth plates defining a second cavity, the second cavity having a second longitudinal axis different from a first longitudinal axis of the first cavity defined by the first and second plates. The second cavity may be positioned downstream of the first cavity along a direction of gravity. The first longitudinal direction may be different from the second longitudinal direction. The first and second cavities may be of different aspect ratios.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein.

DETAILED DESCRIPTION OF ONE OR MORE EMBODIMENTS

Figure 1:
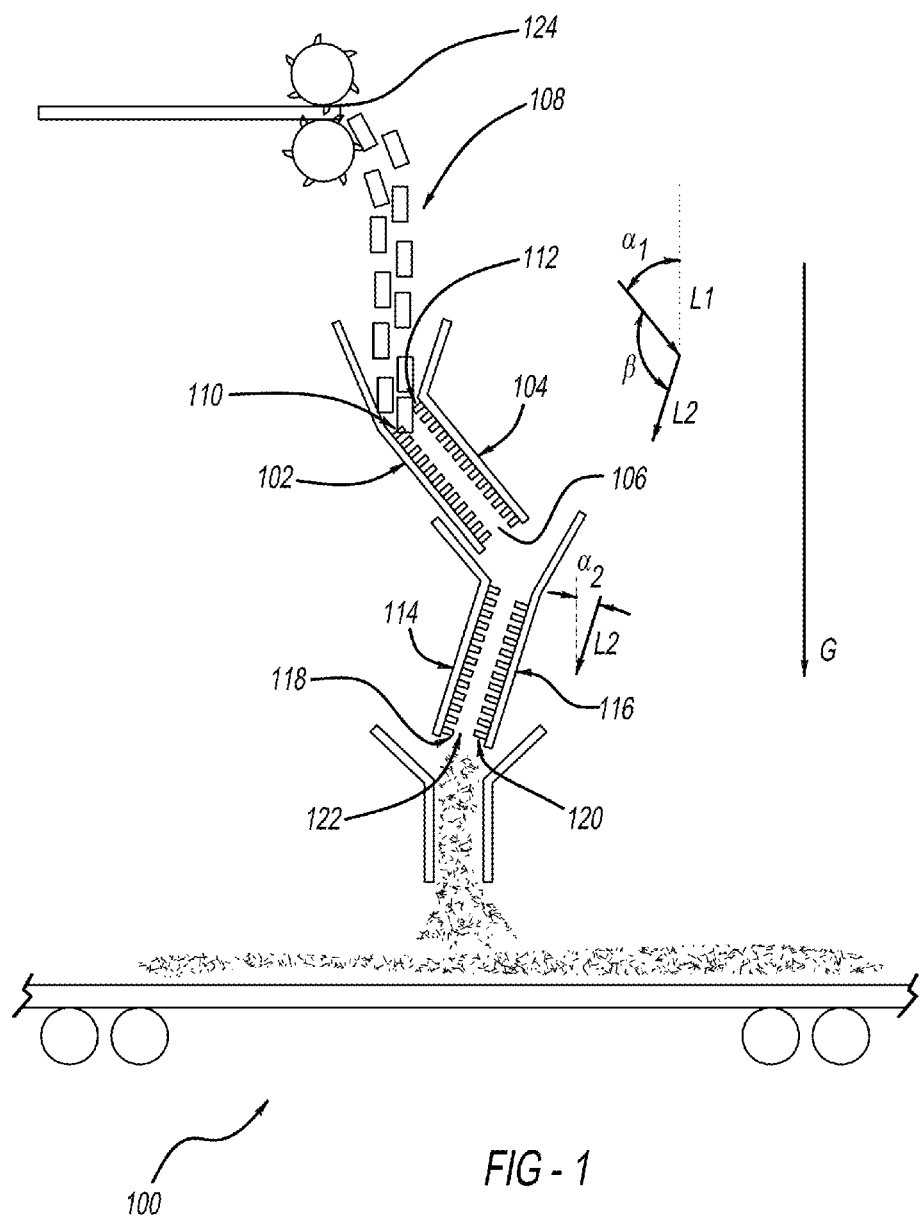
FIG. 1 illustratively depicts a system for scutching material fibers such as carbon fibers in at least one or more embodiments.

As referenced in the FIG.s, the same reference numerals are used to refer to the same components. In the following description, various operating parameters and components are described for different constructed embodiments. These specific parameters and components are included as examples and are not meant to be limiting.

The disclosed inventive concept is believed to have overcome one or more of the problems associated with known production of fiber reinforced sheet molding compound (SMC) such as carbon fiber reinforced SMC. As will be described in more details herein elsewhere, system and method are provided with the present invention for scutching material fibers such as carbon fibers, such that the resultant carbon fibers are provided with greater separation between the fiber filaments and hence greater capacity to be wet out by the resin component in the SMC process. Without wanting to be limited to any particular theory, it is believed that an end product from the scutching process detailed herein below is relatively more randomized, more loosened and entangled. As a result of that the scutched material fibers are provided with greater wettability along a depth dimension or the so-call "z" dimension.

Figure 2A:
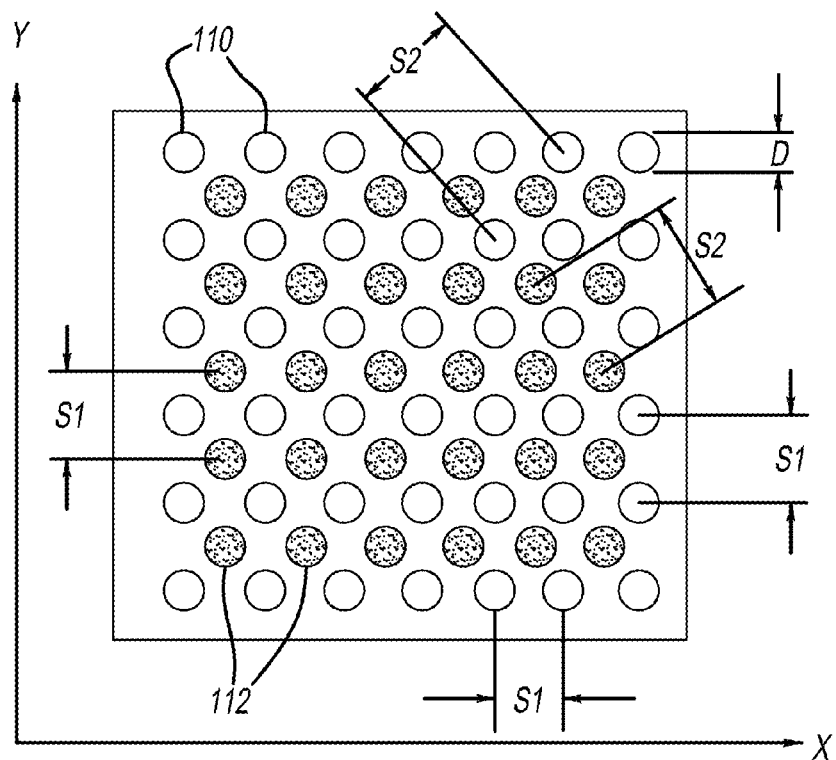
FIG. 2A illustratively depicts a partial plane view of the system referenced in FIG. 1.
Figure 2B:
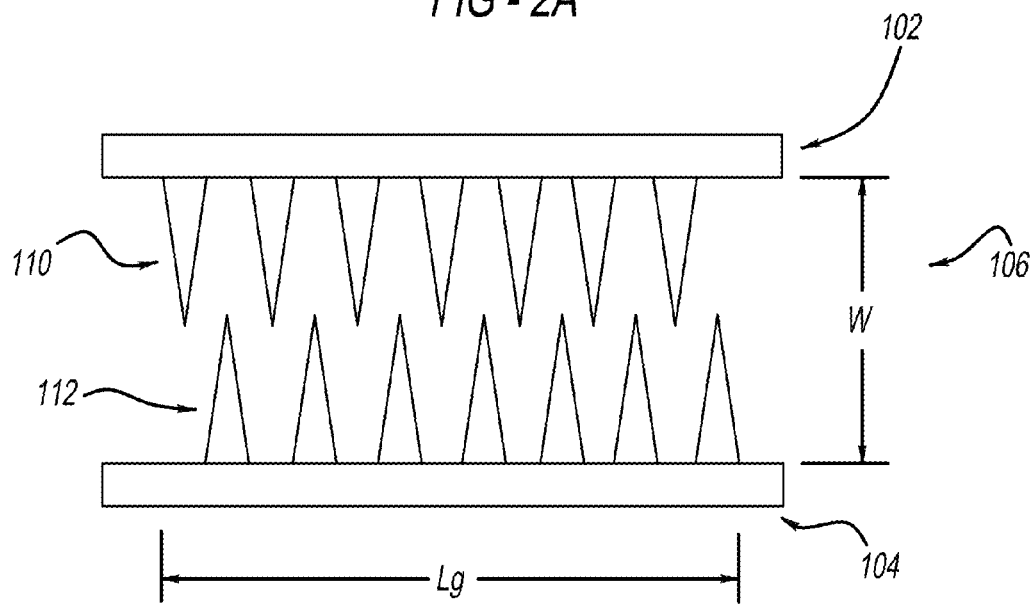
FIG. 2B illustratively depicts a partial side view of the system referenced in FIG. 1.
Figure 3:
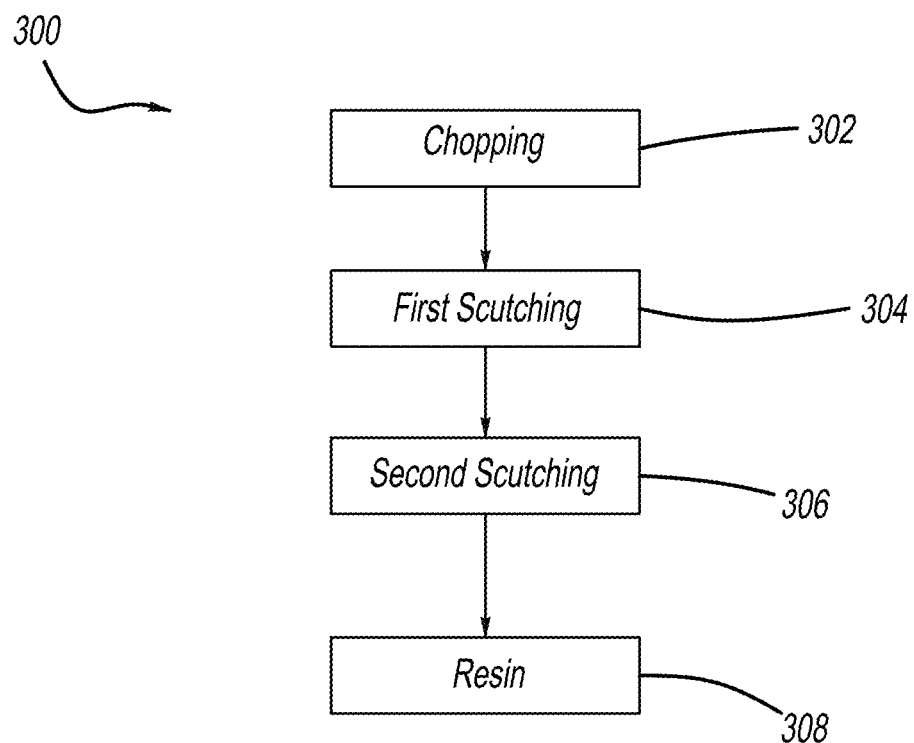
FIG. 3 illustratively depicts a method of scutching material fibers in at least another or more embodiments.

Such method and system are illustratively with more details in FIG. 1 through FIG. 3. For demonstrative purposes, the system and method are described in relation to carbon fibers. However, the system and method may be used for separating or scutching any other suitable material fibers such as natural polymeric fibers such as silk and synthetic polymeric fibers such as plastics.

In at least one or more embodiments, and as depicted in FIG. 1, a system generally shown at 100 for scutching carbon fibers includes first and second plates 102, 104 defining a first cavity 106 to receive and discharge carbon fibers 108, the first plate 102 including a first number of teeth 110 extending into the first cavity 106, the second plate 104 including a second number of teeth 112 extending into the first cavity 106.

FIG. 2A illustratively depicts a plane view of the first number of teeth 110 and the second number of teeth 112. The first number of teeth 110 may be movable in a first direction, such as in the direction of Y. The second number of teeth 112 may be movable in a second direction different from the first direction, such as in the direction of X.

When movable in the first direction, the first number of teeth 110 may be engaged in a motion of bending and/or vibrating, while being fixed in position relative to the first plate 102. Likewise, and when movable in the second direction, the second number of teeth 112 may be engaged in a motion of bending and/or vibrating, while being fixed in position relative to the second plate 104. The first and second plates 102, 104 may be movable in opposite directions along the plane of X, or in opposite directions along the plane of Y. Possibly also, the first and second plates 102, 104 may be movable in one direction along the plane X and another direction along the plane Y, respectively. At least partly because the first direction is different from the second direction as exemplified in these particular arrangements, the first number of teeth 110 and the second number of teeth 112 bypass each other while being movable; accordingly collisions between the first number of teeth 110 and the second number of teeth 112 may be effectively reduced or eliminated.

To effect the movement in the first direction or the second direction, it may also be possible that the first plate 102 and/or the second plate 104 move while the first number of teeth 110 or the second number of teeth 112 do not necessarily move.

The first number of teeth 110 may be made integral in material to the first plate 102. Similarly the second number of teeth 112 may be made integral in material to the second plate 104. Steel is a non-limiting example of the material for forming the first and/or second number of teeth 110, 112, and/or the first and/or second number of plates 102, 104.

FIG. 2B illustratively depicts a cross-sectional view of the first and second plates 102, 104 and the first and second numbers of teeth 110, 112. To render effective tearing effect on the carbon fibers, the first number of teeth 110 has a first average knob height that is greater than half of the cavity width "W" of the first cavity 106. Likewise, the second number of teeth 112 has a second average knob height that is greater than half of the cavity width "W" of the first cavity 106. Accordingly each of the first number of teeth 110 is received within two adjacent teeth in the second number of teeth 112. Likewise, each of the second number of teeth 112 is received within two adjacent teeth in the first number of teeth 110. Accordingly, tearing can be effectively rendered by this pseudo-interlocking arrangement between the first and the second numbers of teeth 110, 112.

Referring back to FIG. 1, the first and second plates 102, 104 are positioned such that carbon fibers move within the first cavity 106 along a direction of gravity. The term "along a direction of gravity" refers to the design that the first cavity 106 has a first longitudinal axis "L1" which is at an angle $\alpha1$ to the direction of gravity "G". Angle $\alpha1$ is a value between 0 and 90 degrees, and in certain instances, 10 to 80 degrees, 20 to 70 degrees, and 30 to 60 degrees.

Referring back to FIG. 2A, at least one of the first and second numbers of teeth 110, 112 are spaced apart from each other. The first and second numbers of teeth 110, 112 may be of any suitable cross-sectional shape, such as round, rectangular, square, triangle, or a random and irregular shape. The first and second numbers of teeth 110, 112 may be formed of any suitable materials, such as metal, plastics, ceramics or any other durable materials. Non-limiting examples of the metal materials include harden metals and alloys such as tooling steel.

Referring back to FIG. 2A, the first number of teeth 110 and/or the second number of teeth 112 have an average cross-section linear dimension "D" in a size range suitable for the material to be scutched. In the event the material to be scutched is carbon fibers, the average cross-section linear dimension "D" is a value ranging from 1 to 50 microns, 2.5 to 35 microns, or 5 to 20 microns.

Referring back to FIG. 2A, the first number of teeth 110 and/or the second number of teeth 112 have an average lateral spacing "S1" or an average diagonal spacing "S2" between any two adjacent teeth. The average spacing "S1" or "S2" may be of a value suitable for the material to be scutched. In the event the material to be scutched is carbon fibers, the average spacing "S1" or "S2" is a value ranging from 1 to 200 microns, 5 to 150 microns, or 10 to 100 microns.

In at least another or more embodiments, and as illustratively depicted in FIG. 1, the system 100 may further include third and fourth plates 114, 116 defining a second cavity 122, the second cavity 122 having a second longitudinal axis "L2" different from the first longitudinal axis "L1" of the first cavity 106 defined by the first and second plates 102, 104. The third plate 114 may include a third number of teeth 118 extending into the second cavity 122 and the fourth plate 116 may include a fourth number of teeth 120 extending into the second cavity 122.

The system 100 does not necessarily include additional plate set such as the third and fourth plates 114, 116. However in the event for achieving additional scutching, additional plate sets may be desirable. In this arrange, additional plate sets such as the third and fourth plates 114, 116 along with the second cavity 122 are positioned downstream of the first and second plates 102, 104 along with the first cavity 106 along a direction of gravity "G".

Similar to the first and second plates 102, 104, and referring back to FIG. 1, the third and fourth plates 114, 116 are positioned such that carbon fibers move within the second cavity 122 along a direction of gravity. The term "along a direction of gravity" refers to the design that the second cavity 122 has a second longitudinal axis "L2" which is at an angle $\alpha2$ to the direction of gravity "G". Angle $\alpha2$ is a value between 0 and 90 degrees, and in certain instances, 10 to 80 degrees, 20 to 70 degrees, and 30 to 60 degrees.

The first longitudinal direction "L1" is different from the second longitudinal direction "L2", at an angle $\beta$. Angle $\beta$ may of a value suitable for the material to be scutched and the level of scutching needed for a particular project. In certain instances, angle $\beta$ is between 45 to 135, 60 to 115, or 75 to 100 degrees.

The third number of teeth 118 may be made integral in material to the third plate 114. Similarly the fourth number of teeth 120 may be made integral in material to the fourth plate 116. Steel is a non-limiting example of the material for forming the third and/or fourth number of teeth 118, 120, and/or the third and/or fourth number of plates 114, 116.

The third and fourth plates 114, 116 may be movable in opposite directions along the plane of X, or in opposite directions along the plane of Y. Possibly also, the third and fourth plates 114, 116 may be movable in one direction along the plane X and another direction along the plane Y, respectively. At least partly because the first direction is different from the second direction as exemplified in these particular arrangements, the third number of teeth 118 and the fourth number of teeth 120 bypass each other; accordingly, collisions between the third number of teeth 118 and the fourth number of teeth 120 may be effectively reduced or eliminated.

Referring back to FIG. 2B, the first and second cavities 106, 122 are of any suitable aspect ratio represented by cavity width "W" to length "Lg" ratio. In certain instances, the first and second cavities 106, 122 are of different aspect ratios such as scutching in variable degrees may be achieved accordingly.

Referring back to FIG. 1, the system 100 may further include a chopper 124 positioned upstream of the first cavity 106. The chopper 124 chops and shortens the starting carbon fiber material or carbon fiber tows to make shortened carbon fiber tows for downstream process through the first cavity 106 and optionally further downstream processes such as those facilitated by the second cavity 122. The chopping process delivered by the chopper 124 does not necessarily involve any reduction in the cross-sectional thickness of the carbon fibers; rather the chopping process is intended to make the carbon fiber tows shorter in length wise.

In view of the description provided herein in relation to the system 100, a method of scutching carbon fibers and forming a sheet molding compound using the scutched carbon fibers is illustratively depicted in FIG. 3. In a non-limiting example, the method 300 includes step 302, at which starting carbon fiber tows are chopped in lengthwise into shortened carbon fiber tows.

At step 304, the shortened carbon fiber tows are caused to pass through the first cavity 106 defined by the first and second plates 102, 104 to form first scutched carbon fibers.

At step 306, the first scutched carbon fibers may optionally be caused to pass through the second cavity 122 defined by the third and fourth plates 114, 116 for additional scutching to form second scutched carbon fibers, which may be subjected to further scutching via one or more scutching steps similar to steps 304, 306.

At step 308, the second scutched carbon fibers from step 306 are combined with resin via any suitable and known methods to form sheet molding compounds.

EXAMPLE

Figure 4A:
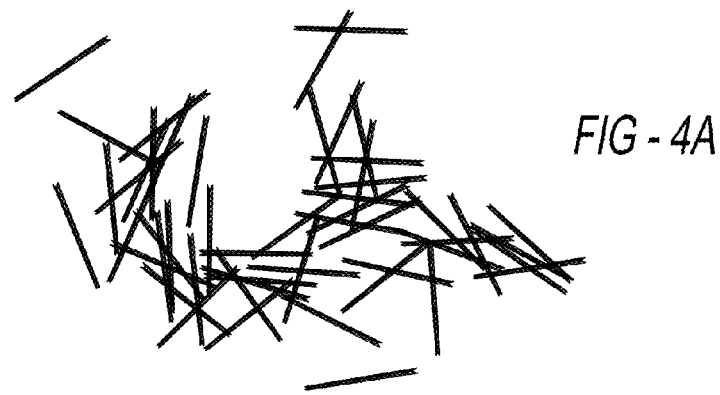
FIG. 4A shows a sample of chopped carbon fiber tows according to the Example.

In a non-limiting example, FIG. 4A shows chopped carbon fiber tows, with an average tow size of about 3,000 filaments per tow and an average fiber tow length of about 1 inch.

Figure 4B:
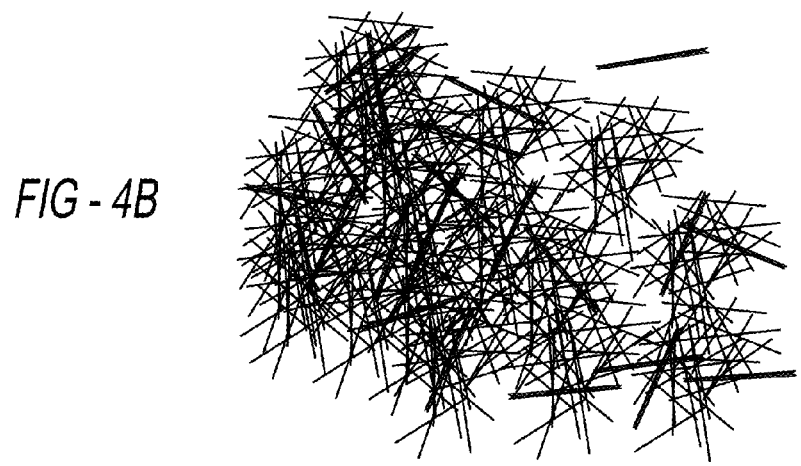
FIG. 4B shows a scutched version of the sample referenced in FIG. 4A using a non-limiting method referenced in FIG. 3 in view of FIG. 1.

FIG. 4B shows a scutched version of the chopped carbon fiber tows referenced in FIG. 4A, wherein the latter has been processed through a first pair of plates such as the first and second plates 102, 104 illustratively depicted in FIG. 1. As can be seen from FIG. 4B, at least parts of the chopped carbon fiber tows have been fully or partially separated after the first pass of scutching, and the resulting fibers are presented with enhanced randomness.

Figure 4C:
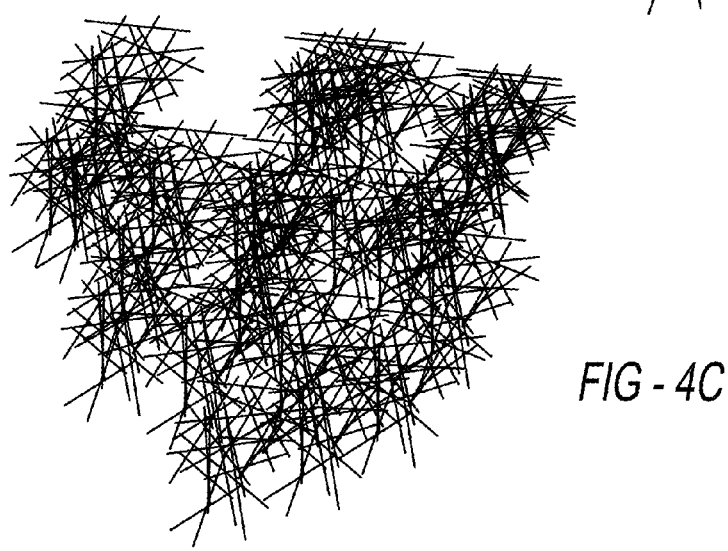
FIG. 4C shows a further scutched version of the sample referenced in FIG. 4B using a non-limiting method referenced in FIG. 3 in view of FIG. 1.

FIG. 4C shows a further scutched version of the scutched carbon fiber tows referenced in FIG. 4B, wherein the latter has been processed through a second pair of plates such as the third and fourth plates 114, 116 illustratively depicted in FIG. 1. As can be seen from FIG. 4C, the previously scutched carbon fiber tow are now fully separated after the second pass of scutching, and the resulting fibers are presented with a "cotton" like appearance and even greater randomness.

In one or more embodiments, the disclosed invention as set forth herein is believed to have overcome one or more of the challenges faced by known production of carbon fiber reinforced SMC. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A system, comprising:
    first and second plates defining a first cavity, the first plate including first teeth extending into the first cavity and movable in a first direction, the second plate including second teeth extending into the first cavity and movable in a second direction different from the first direction, wherein the first plate is movable along a plane of the first direction; and
    third and fourth plates defining a second cavity, the second cavity having a second longitudinal axis different from a first longitudinal axis of the first cavity defined by the first and second plates.

2. The system of claim 1, wherein the first and second directions are positioned such that the first teeth do not contact the second teeth.

3. The system of claim 1, wherein at least one of the first and second teeth are spaced apart from each other.

4. The system of claim 1, wherein the second cavity is positioned downstream of the first cavity along a direction of gravity.

5. The system of claim 1, wherein the first and second teeth are integral in material to the first and second plates, respectively.

6. The system of claim 1 wherein the first and second cavities are of different aspect ratios.

7. The system of claim 1 wherein the third plate include third teeth extending into the second cavity, the fourth plate include fourth teeth extending into the second cavity, and the third and fourth teeth are integral in material to the third and fourth plates, respectively.

8. A system, comprising:
    first and second plates defining a first cavity, the first plate movable in a first direction and including first teeth extending into the first cavity, the second plate movable in a second direction different from the first direction and including second teeth extending into the first cavity, the first plate being movable along a plane of the first direction and the second plate being movable along a plane of the second direction; and
    third and fourth plates defining a second cavity, the second cavity having a second longitudinal axis different from a first longitudinal axis of the first cavity defined by the first and second plates.

9. The system of claim 8, wherein a combined total of a first average length of the first teeth and a second average length of the second teeth is greater than an average width of the first cavity.

10. The system of claim 8, wherein the first and second cavities are of different aspect ratios.

* * * * *